(12) United States Patent
Kulkarni et al.

(10) Patent No.: US 11,610,556 B2
(45) Date of Patent: Mar. 21, 2023

(54) BRAKE CONTROL DISPLAY UNIT WITH AMBIENT LIGHT DIMMING

(71) Applicant: HORIZON GLOBAL AMERICAS INC., Plymouth, MI (US)

(72) Inventors: Chandrakumar D. Kulkarni, Battle Creek, MI (US); Joseph Bradford Wells, Jackson, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 399 days.

(21) Appl. No.: 16/603,262

(22) PCT Filed: Apr. 10, 2018

(86) PCT No.: PCT/US2018/026838
§ 371 (c)(1),
(2) Date: Oct. 7, 2019

(87) PCT Pub. No.: WO2018/191232
PCT Pub. Date: Oct. 18, 2018

(65) Prior Publication Data
US 2020/0039354 A1    Feb. 6, 2020

Related U.S. Application Data

(60) Provisional application No. 62/483,488, filed on Apr. 10, 2017.

(51) Int. Cl.
*G09G 3/34* (2006.01)
*B60T 7/20* (2006.01)
(Continued)

(52) U.S. Cl.
CPC ............ *G09G 3/3406* (2013.01); *B60K 35/00* (2013.01); *B60T 7/20* (2013.01); *B60T 8/17* (2013.01);
(Continued)

(58) Field of Classification Search
CPC .......... G09G 3/3406; G09G 3/00; G09G 5/10; G09G 2320/064; G09G 2354/00; G09G 2360/141; G09G 2360/144; G09G 2380/10; G09G 2320/0626; B60K 35/00; B60K 2370/152; B60K 2370/349;
(Continued)

(56) References Cited

U.S. PATENT DOCUMENTS

2005/0051708 A1 *  3/2005  Hotelling ................. G01J 1/00
2007/0090962 A1 *  4/2007  Price ........................ G08B 5/36
                                                                  340/815.45
(Continued)

OTHER PUBLICATIONS

International Search Report and Written Opinion dated Jul. 31, 2018; International Patent Application No. PCT/US2018/026838 filed Apr. 10, 2018. ISA/US.

*Primary Examiner* — Douglas M Wilson
(74) *Attorney, Agent, or Firm* — McDonald Hopkins LLC

(57) ABSTRACT

A brake control system includes a display, a processor, and a light sensor. The processor controls brakes of a towed vehicle. The processor also controls a brightness of the display based on information received from the light sensor. The light sensor may include a light dependent resistor or a photoresistor. The processor selectively sets or adjusts the brightness of the display based on sensed ambient light.

18 Claims, 4 Drawing Sheets

(51) Int. Cl.
*B60T 8/17* (2006.01)
*B60T 17/22* (2006.01)
*G09G 5/10* (2006.01)
*G09G 3/00* (2006.01)
*B60K 35/00* (2006.01)

(52) U.S. Cl.
CPC ............ *B60T 17/22* (2013.01); *G09G 3/00* (2013.01); *G09G 5/10* (2013.01); *B60K 2370/152* (2019.05); *B60K 2370/349* (2019.05); *B60K 2370/55* (2019.05); *B60K 2370/5915* (2019.05); *G09G 2320/064* (2013.01); *G09G 2354/00* (2013.01); *G09G 2360/141* (2013.01); *G09G 2360/144* (2013.01); *G09G 2380/10* (2013.01)

(58) Field of Classification Search
CPC ........ B60K 2370/55; B60K 2370/5915; B60K 2370/589; B60K 37/06; B60T 7/20; B60T 8/17; B60T 17/22; B60T 7/02
See application file for complete search history.

(56) References Cited

U.S. PATENT DOCUMENTS

| | | | |
|---|---|---|---|
| 2008/0303806 A1* | 12/2008 | Perrin | G09G 3/3611 345/207 |
| 2010/0152989 A1* | 6/2010 | Smith | B60T 7/085 303/20 |
| 2010/0201896 A1 | 8/2010 | Ostreko et al. | |
| 2013/0328842 A1* | 12/2013 | Barnhoefer | G06F 3/0043 345/207 |
| 2014/0021869 A1* | 1/2014 | Kerr | G09G 5/10 315/158 |
| 2014/0132578 A1* | 5/2014 | Zheng | G01J 1/4228 345/207 |
| 2014/0292208 A1 | 10/2014 | Chemel et al. | |
| 2016/0023642 A1 | 1/2016 | Smith et al. | |
| 2016/0071467 A1* | 3/2016 | Elder | G01N 27/27 205/792 |
| 2016/0110846 A1* | 4/2016 | Park | G09G 5/02 345/589 |
| 2017/0053604 A1* | 2/2017 | Li | G09G 3/3406 |
| 2018/0090077 A1* | 3/2018 | Zou | G09G 3/3406 |

* cited by examiner

BRAKE CONTROL DISPLAY UNIT WITH AMBIENT LIGHT DIMMING

CROSS-REFERENCE TO RELATED APPLICATION

This application is a 35 U.S.C. 371 national stage filing of PCT Application No. PCT/US2018/026838 filed Apr. 10, 2018 and entitled "BRAKE CONTROL DISPLAY UNIT WITH AMBIENT LIGHT DIMMING," which claims priority to U.S. Provisional Patent Application No. 62/483,488 entitled "BRAKE CONTROL DISPLAY UNIT WITH AMBIENT LIGHT DIMMING," filed on Apr. 10, 2017, each of which are incorporated herein by reference in its their entirety.

TECHNICAL FIELD

The present disclosure relates generally to trailer brake control units having a user interface and, more specifically, to automated brightness adjustment for such interfaces.

BACKGROUND

A variety of brake controllers may be employed to control the brakes of a towed vehicle. Typically, these controllers actuate the brakes on a towed vehicle in response to braking by the towing vehicle itself. More specifically, brake controllers rely on measurements from sensors, present information, actuation/requests made by the user in real time, other preprogrammed algorithms, and the like, in order to detect the towing vehicle braking signal and, depending upon conditions (e.g., braking signal, acceleration, etc.), modify the braking signal used by the towed vehicle. The net result is a coordinated approach to braking by both the towing and towed vehicle that reduces the likelihood of skidding, jack-knifing, swaying, and the like for both vehicles.

The brake controller system relies on components that are often mounted to one or both of the towed and the towing vehicle. A brake control unit consists of an electronics package that communicates with the braking system of the towed vehicle. The brake control unit may have a display. The display is typically mounted in the cab or passenger compartment of the towing vehicle.

The display usually includes a screen or graphical interface, coupled with input mechanisms (buttons, keyboard, etc.). More specifically, because brake controllers can rely on preset or dynamically input variables, such as weather/road conditions, vehicle weight, temperature, and other parameters, the display often provides real-time diagnostic and/or operational feedback that may require additional input or action from the user.

Therefore, there is need for an improved aftermarket trailer brake control system, and more particularly, for a trailer brake control system that adjusts a brightness of a display.

DESCRIPTION OF THE DRAWINGS

Operation of the disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

DETAILED DESCRIPTION

Figure 1:
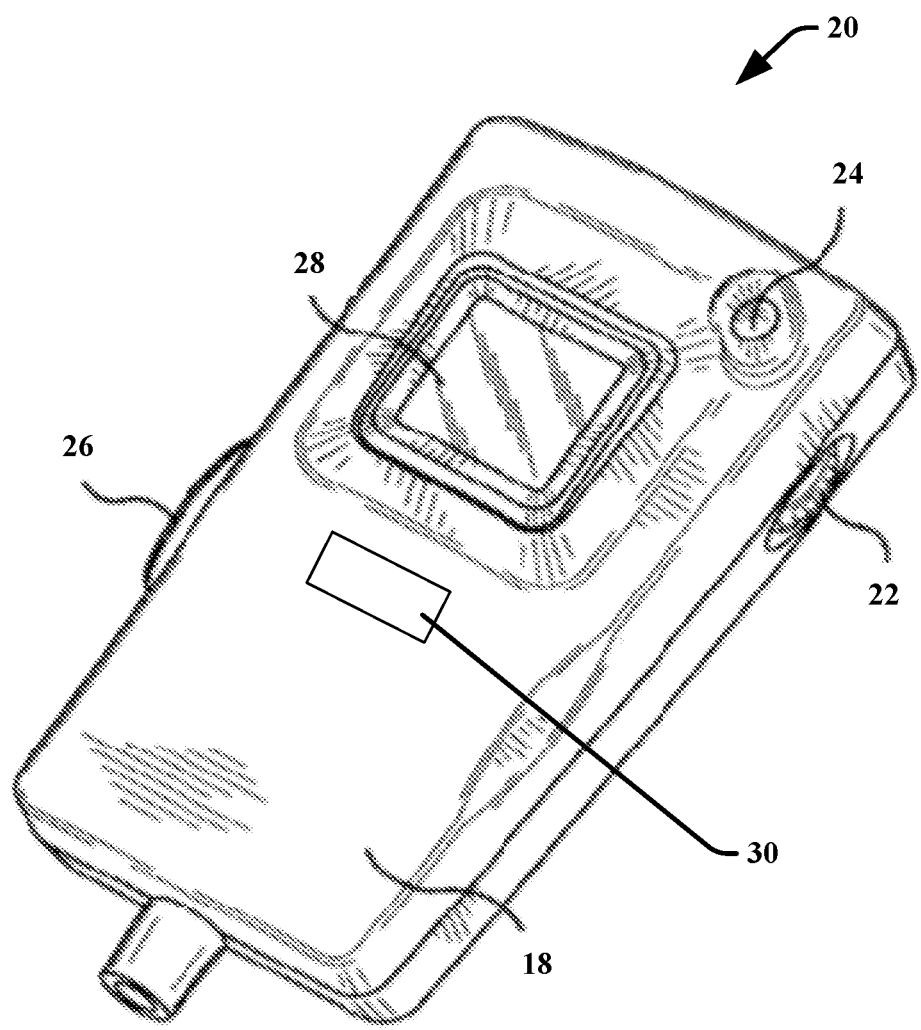
FIG. 1 is a perspective view of a hand control unit for a trailer brake controller according to various disclosed aspects.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action may not require human action.

The term light sensor may be utilized to refer to an electronic device or circuitry that measures ambient light levels. Ambient light generally refers to visible light in an external environment. For instance, ambient light may be generated by internal lights within a vehicle cab, electronic lights, the sun, or other light sources. Light sensors may include photodetectors of various types, such as phototransistors, photoresistors (e.g., light dependent resistors (LDR)), semiconductors, photovoltaic devices, thermal devices, photochemical devices, polarization devices, or the like. It is noted that such terms may be utilized interchangeably herein. Accordingly, while embodiments may refer to a particular type of light sensor, various other types of light sensors may be utilized. For example, embodiments that reference an LDR may utilize phototransistors or other light sensors.

As used herein, a towing vehicle may include various types of automobiles (e.g., car, truck, recreational vehicle ("RV"), etc.). A towed vehicle may include trailers (e.g., agricultural trails, boat trailers, etc.), an automobile, or the like. It is noted that various combinations of towed vehicles and towing vehicles may utilize some or all aspects of this disclosure.

Disclosed embodiments may refer to a brake controller, brake controller device, or the like. Such terms are used interchangeably to describe electronic devices that control the brakes of a trailer or towed vehicle. Examples of such controller can be found in U.S. Pat. Nos. 9,150,201; 8,789,896; 8,746,812; and 6,615,125, all of which are incorporated by reference. For instance, a brake controller may comprise a unit that is mounted in or on a towing vehicle. The towing vehicle is attached to a towed vehicle (e.g., via a hitch or the like). The towing vehicle may pull, push, or otherwise tow the towed vehicle. The brake controller system may monitor acceleration and application of a brake pedal to control the brakes of the towed vehicle to operatively apply (e.g., engage, release, etc.) the towed vehicle brakes. Moreover, while embodiments may refer to a brake controller system comprising various components, such components may be a single device or multiple devices in communication with each other. For example, a brake controller may include a display, a processing unit, and an accelerometer. These components may be comprised within a single housing or in multiple housings. In another aspect, the brake controller may include controls or user interfaces (e.g., buttons, knobs, switches, etc.) that may allow a user to interact with the brake controller. These controls may be disposed directly on a main housing or may be disposed on a hand control unit communicatively coupled to the main housing. The components may include wiring, circuitry, or the like. In at least one embodiment, different components of the brake controller may be mounted in or on various parts of a towing or towed vehicle. It is noted that the brake controller may include other components that provide for various other features. For instance, a brake controller system may include anti-sway devices, converters, trailer breakaway systems, tire pressure monitoring systems for trailers, vehicle speed monitoring systems, user equipment devices, internet or network connected devices, external cameras, and the like.

Disclosed embodiments may refer to a user interface. As used herein, a user interface may include devices that receive input from a user and transmits the input to electronic circuitry, such as a microprocessor, or output information from electronic circuitry to a user. Such user interfaces may include buttons, switches, knobs, touch screens (e.g., capacitive touch screens), microphones, image capturing devices, motion sensors, pressure sensors, a display screen, a speaker, a light (e.g., LED, bulb, etc.), or the like. For brevity, examples may be described with reference to a user interface in general rather than any particular type of user interface. It is noted that brake controllers may include multiple user interfaces of various types.

In some applications, it may be important to have a proper level of brightness especially as more and more units rely on liquid crystal displays LCD or LED display screens. Insufficient lighting for these display screens can make them difficult to read, especially in direct sunlight. Conversely, an overly-bright display may present a distraction during night driving.

Some vehicles may allow the driver to manually dim or brighten the dashboard display(s) (which may include a digital clock, a speedometer, a gear shift indicator, and/or other information). Typically, the driver engages a push switch or knob controlling a potentiometer to adjust the brightness level. The vehicle may rely on its controller area network (CAN) to automatically adjust all of the pertinent displays. The displays, however, may be disposed to different amounts of ambient light. For instance, depending upon the position of a particular display (e.g., above the dashboard on an area that is typically exposed to ambient light vs. proximate to the passenger floor where significantly less ambient light exists), one display may be in direct sunlight, while another display is below a dashboard and not in sunlight.

The particular needs of an aftermarket display screen associated with a trailer brake controller are not specifically addressed. Further, user-initiated changes to the brightness of the screen can present a distraction for drivers. Consequently, a trailer brake control display unit that automatically adjusted to an appropriate level of brightness based on its immediately accessible ambient light is needed.

According to various disclosed embodiments, a display screen of a brake control system may be properly illuminated. The illumination may be adjusted based at least in part on positioning of a light sensor, orientation of a light sensor, sensed ambient light, or parameters of a lens. As will be described herein, the illumination may be controlled by a control signal, such as a PWM or other type of electronic signal (e.g., signals controlled by voltage, current, amplitude, or the like). In an example, a brake control system may adjust a transfer function of a light sensor output verses a brightness based on a user preference, calibration setting, or the like. In other embodiments, a brake control system may include a display driver coupled to the display screen. A light sensor may measure ambient light and a processor may receive the measured level of light and generate a command to the display driver. The command may include a level of brightness at which to operate lights of the display screen.

The present disclosure includes a system, method, and devices related to data. A brake control unit comprises a processor, a light sensor coupled to the processor and configured to operatively sense ambient light, and a display coupled to the processor and comprising at least one light source, wherein the processor is configured to operatively adjust a brightness of the at least one light source based at least in part on an intensity of the sensed ambient light.

In embodiments the processor determines the intensity of the sensed ambient light based on at least two readings of the light sensor. In another aspect, the processor applies a transfer function that generates a brightness setting for the at least one light based on the intensity of the sensed ambient light. The transfer function may be based at least in part on a position of the light sensor or an orientation of the light sensor. In another aspect, the brake control unit may include a lens disposed over the light sensor and wherein the transfer function is based at least in part on parameters associated with the lens. The light sensor may comprise at least one of a phototransistor or a photoresistor. The processor may modulate a duty cycle of a pulse width modulated signal sent to the display to adjust the brightness or adjust a frequency of a signal sent to the display to adjust the brightness. The brake control unit may comprise an accelerometer coupled to the processor, wherein the processor operatively adjusts a signal to be sent to brakes of a towed vehicle based on output of the accelerometer. The processor may operatively control the at least one light to display information associated with the signal to be sent to the brakes of the towed vehicle.

Also disclosed is a brake control system for controlling brakes of a towed vehicle, the brake control system comprising a housing, a display positioned on or in the housing, a light sensor disposed proximal to the display, and a processor configured to operatively determine a brightness for the display based on output of the light sensor, and wherein the processor is configured to initiate application of brakes of a towed vehicle. The brake control system may comprise a brake load switching circuit configured to selectively apply or adjust a signal to be sent to a brake load from the processor. In another aspect, the brake control system may comprise a display driver communicatively coupled to the processor and configured to operative control the brightness of the display based on input from the processor.

A method is described. The method may include measuring ambient light with a light sensor of a brake control unit comprising a brake control unit comprising a processor, a light source, and a display, determining, by the processor, a brightness for the display based on the measured ambient light, generating, by the processor, a signal to adjust the brightness, and adjusting the brightness of the display based on the generated signal to adjust the brightness. The method may further comprise determining the brightness based at least in part on at least one of an orientation or position of the light sensor. In another aspect, the method may filter output of the light sensor by the processor via an averaging function. As such, the method may store a history of readings of the light sensor in memory. The method may allow for receiving user input associated with the brightness of the display, wherein determining a brightness of the display is further based on the user input. Additionally, the method may provide the light sensor proximal to the display.

The foregoing embodiments are merely exemplary of some of the aspects of the system. Additional features and elements may be contemplated and described herein. Also, features from one of the foregoing embodiments may be combined with features from any of the other foregoing embodiments.

Turning to FIG. 1, there is a hand control unit 20 for a brake controller. The hand control unit 20 may be operable to receive user input for various brake control parameters and communicate that user input to a brake control unit which produces appropriate braking signals for the towed and/or towing vehicle. The brake control unit may actuate a towed vehicle's brakes in accordance with the brake control parameters inputted by the user into the hand control unit 20 or measured by a sensor.

Hand control unit 20 may visually and or audibly alert, or otherwise communicate, the user concerning a braking and/or other operational information via a user interface. In turn, the user may adjust one or more brake control parameters or make any other necessary and/or desirable adjustments in response to this feedback.

Hand control unit 20 may be of any appropriate shape or size, such as a generally rectangular, triangular, circular shape, ergonomic, or the like. For example, the hand control unit 20 may generally be an easily movable type of remote. The hand control unit 20 may be located at any appropriate location, such as within the towing vehicle's cab or passenger compartment and within the user's reach, whereby the user may easily input instructions and receive feedback from the hand control unit 20.

The hand control unit 20 includes a body 18 with integral controls 22, 24, and/or 26 and at least one display surface 28. For example, the integral controls may include a power or gain wheel 22, a boost button 24 and a manual or control knob 26 for receiving instructions from the user, as well as a display screen 28 and an optional loudspeaker and/or microphone (not shown) for providing feedback to the user, such as settings, outputs and faults. The functions and specific physical apparatus specifically identified for integrated controls 22, 24, and 26 are merely exemplary, and other functions (including associated buttons, dials, switches, touch screens, and other controls) may be provided in place of or in addition to those noted below. By the same token, aside from the fundamental functionality of providing brake control to the towing and/or towed vehicle, the any of the specific functions associated with controls 22, 24, and 26 identified below may be altered, combined, or omitted.

In some embodiments a power supply, a processor, and other circuitry may be provided within the body 18. As used herein, the term processor may include a general-purpose processor, a microcontroller (e.g., an execution unit with memory, etc., integrated within an integrated circuit), a digital signal processor (DSP), a programmable logic device (PLD) or an application specific integrated circuit (ASIC), among any other appropriate type of processing devices. The output to the other components of the brake control system by the Hand control unit 20 may be by way of wired and/or wireless connections.

The gain wheel 22 may allow the user to selectively set and change the maximum braking force supplied (i.e., maximum brake output voltage) to the towed vehicle's brakes by the control unit. The gain wheel 22 may be of any appropriate type, such as a rotary or wheel-type potentiometer. It will be understood, however, that any input device that allows the user to increase or decrease the gain setting may be employed. For example, a linear-travel potentiometer, digitally controlled potentiometer, touch portions on a display screen, displacement transducer, alphanumeric keyboard, or the like may be used. The microprocessor may receive, store and transmit the gain control settings from the user's adjustment of the wheel 22 to the control module.

During either manual or automatic operation, power adjustment may immediately change the maximum output voltage that may be applied to the electric brake magnets. For a given fixed gain wheel 22 setting, the output from a full manual control application should be the substantially the same as the full output from the deceleration determined by one or more accelerometers. The gain wheel 22 may be interfaced via an analog input directly connected to the microprocessor.

A boost button 24 may be provided to permit adjustment of how quickly the trailer brakes respond to the application of the towing vehicles brakes. The boost button 24 may be a separate button that may increment or change the boost setting in the brake controller to allow the user to selective set the initial brake output voltage of the control unit.

The boost button 24 may allow the user to change deceleration parameters based on the towed vehicle's size, weight, and road conditions. Typically, the requisite amount of boost may be proportional to the weight of the towed vehicle. For example, the larger and heavier the towed vehicle, the greater the boost setting employed. Various boost levels or settings may be pre-programmed into the processor (and/or associated memory units and profiles incorporated into brake controller). In this manner, the boost button 24 may be employed to cycle through the various boost settings until the user finds the boost setting of choice.

Alternatively, a user may manually input the desired boost setting. Automated operation, based upon input from the vehicle CAN, the control unit, or other data sources may be used.

In normal automatic operation, the brake controller 10 may ramp up the output voltage from zero to the voltage set by the gain wheel 22 setting, in proportion to the deceleration sensed by the brake controller (e.g., by way of an accelerometer). The output voltage may be determined based on current boost settings and any applied algorithms. The necessary deceleration required to reach the maximum power setting may be reduced for each level of boost.

While the brake controller may employ the boost button 24, it will be understood that any appropriate type of input device that allows a user to either cycle through various pre-programmed boost settings and/or manually input an initial brake output voltage may be employed. For example, rotary potentiometer, linear-travel potentiometer, digitally controlled potentiometer, touch portions on a display screen, displacement transducer, alphanumeric keyboard, and the like.

The manual control or knob 26 may selectively actuate the towed vehicle's brakes when the user moves the knob 26 from a rest position. This may allow the user to manually apply the towed vehicle's brakes without having to depress the towing vehicle's brake pedal. The manual knob 26 may be of any appropriate type, such as a spring-loaded, linear-travel potentiometer, whereby the further the knob 26 is moved from the rest position, the greater the braking force (i.e., brake output voltage) applied by the towed vehicle's brakes.

While the manual knob 26 may be a spring-loaded, linear-travel potentiometer, it will be understood that any appropriate type of input device that allows the user to manually apply and vary the braking force of the towed vehicle's brakes may be employed. For example, a rotary potentiometer, digitally controlled potentiometer, touch portions on a display screen, displacement transducer, alphanumeric keyboard, and the like may be used. The microprocessor may receive, store and transmit the manual control settings from the user adjustment of the knob 26 to the control module.

The manual knob 26 may provide an increasing brake output voltage from the brake controller as the manual knob 26 is moved from the at rest position. Activation of the manual knob 26 may also immediately wake up the hand control unit 20, turn the display on, and indicate trailer connectivity when the trailer is connected or not connected.

When the manual knob 26 is used simultaneously with the automatic mode during a braking event, the function that produces the greater brake output voltage will become dominant The manual control input to the brake controller allows the operator to manually apply trailer brakes without having to depress the brake pedal. By holding the manual knob 26 at maximum, the user may adjust the desired maximum power by adjusting the gain wheel 22.

In terms of its effect on the braking voltage, the manual knob 26 may have a range from 0.0 volts minimum to a maximum voltage set by the gain wheel 22. The hand control unit's 20 microprocessor may learn the mechanical travel limits of the manual knob 26 and store these values. These values may be used to set the minimum and maximum limits of travel for the manual software algorithm. The hand control unit's 20 microprocessor may supply both the power supply and ground reference to the manual knob 26 potentiometer. When the manual knob 26 is activated, it may cause a flashing display message to become stationary while the manual knob 26 is held on.

The user may use both the gain wheel 22 and the manual knob 26 to set the maximum braking force applied during a full braking event. For example, the towed vehicle's brakes may be fully applied with the manual knob 26 while simultaneously setting the maximum brake output voltage with the gain wheel 22. The maximum brake output voltage may be limited by the gain wheel 22 adjustment setting. This gain set point may allow the operator to limit the towed vehicle's wheel skidding during a braking event. In addition, if the brake pedal is depressed while the manual knob 26 is also actuated, the function that produces the greater output voltage at the control unit will be used.

The hand control unit 20 may include a display 28. The display 28 may be of any appropriate shape, size and type. Generally speaking, rectangular, square or arc-shaped screens may provide a sleek and dynamic aesthetic. In some embodiments, a two character, seven segment LED display may be utilized. It is noted that the display 28 may comprise an LED, OLED, LCD, or other graphical display device, and the display 28 may possess touch and/or swipe functionality in place of or in addition to any of the separate control forms mentioned above. The display 28 may be a combination of different types, and depending on the mode of operation, power requirements, input/feedback functions of the overall system, and the like. It is noted that the display 28 may include a lens as described herein.

In addition or alternatively, the display screen 28 and/or loudspeaker 34 may notify or warn the user of certain fault conditions whereby the display screen 28 shows an alphanumeric code corresponding with a specific fault condition which may also be accompanied by a beep, tone or series of beeps and/or tones annunciated by the loudspeaker 34. Such codes allow for smaller and more cost effective display screens to be employed, while still conveying a broad range of useful information to the operator. For example, some fault conditions with alphanumeric codes may include: "NC" for no connectivity or loss of connectivity between the towing and towed vehicle; "SH" for a short circuit in the towed vehicle's electric brake circuit or a shorted electric brake magnet; "OL" for an electrical overload or an exceeding of a pre-defined brake output current during a braking event; "OG" for an open ground sensed on the power control unit; and "ER" for error conditions.

It is to be understood that other fault conditions and corresponding alphanumeric codes may also be displayed and/or annunciated and those described herein are for illustrative purposes only. Moreover various other error codes and fault conditions may be utilized. As an alternative, the display screen 28 may describe the fault condition in full text and/or employ a voice module to enunciate the detection of certain fault conditions.

The hand control unit 20 may also be equipped with a an optional speaker and/or microphone combination. This combination enables audible information to be provided to and received from the brake controller system. Virtually any appropriate type of information, such as verification of user input, information received from the control unit or larger system, can be communicated, with the display 28 providing verification/reminders.

System feedback and operator input, such as trailer connection, output voltage, and diagnostic information may be also displayed via display 28. The gain wheel 22 setting and relative trailer braking power during a braking event may be provided to the operator visually display 28. Additional information, including system diagnostics may be shown on the display 28.

In one aspect, a two-digit LED display 28 may be used. It will be appreciated, however, that any variety of display screens may be employed, including but not limited to LCD, vacuum fluorescent, touch-screen and the like. In addition, the user's gain and/or boost setting may be displayed on the screen 28. The display screen 28 may also indicate that the respective status of the system's components, including their connectivity, battery/power levels (if applicable), active/inactive status and the like.

Many of the technologies noted above require backlighting and/or illumination of specific projected or formed characters on the screen. However, as noted above, the precise location of the display unit 28 within the vehicle, coupled with the ambient light and incidence angle of ambient light may make it difficult for the operator to see and distinguish visual information on the display panel. Therefore, one or more light sensors 30 may be integrated in or on the body 18 proximate to the display 28. In some embodiments, a portion of the body 18 may comprise a transparent or partially transparent lens. The light sensor 30 may be embedded in the body proximate the lens in a manner that may conceal the presence of the light sensor 30.

In some embodiments, the light sensor 30 may be calibrated so that any filtering or alteration of light as it passes through the lens material is adequately accounted for in the generation of signals described below. It is noted that filtering may be done through various forms of logic, such as hardware and software. For instance, the grade, color, shape, and placement of the lens may affect readings of the light sensor 30. In at least one example, a concave or convex lens is positioned appropriately in front of the light sensor 30 such that readings of the light sensor 30 represent appropriate ambient light measurements.

As an example, a processor may receive readings from the light sensor 30. The processor may apply smoothing or averaging functions to a history of readings. For instance, the processor may average l readings, where l is a number. The number of readings may be taken periodically, such as every p msec. The processor may utilize a rolling average of the l readings for determining a brightness level at which to set the display 28. It is noted that various other types of averaging algorithms may be utilized. In an aspect, basing calculations on a history of light sensor 30 readings may reduce effects of apparitions in the light sensor 30 output. Such apparitions may be the result of a vehicle passing under a shaded tree, a user briefly placing a hand over the light sensor 30, or the like.

Moreover, it is noted that the brightness of the display 28 may be adjusted based on a triggering event. Such triggering events may include passage of time (e.g., every 100 msec, 200 msec, 250 msec, etc.), user input (e.g., a button press, motion detection, voice command, etc.), a light sensor 28 reading, or the like. According to some embodiments, adjustments to the brightness may be made on a continual basis or may be granular. For example, the hand control unit 20 may adjust a brightness of the display 28 in steps where a first level of brightness is associated with a first range of light sensor 30 output, a second level of brightness is associated with a second range of light sensor 30 output, etc. It is noted that a user may select different types of adjustments, sensitivities, or the like.

The light sensor 30 comprises a semiconductor or other material(s), such as a photoresistor as described herein. The photoresistor's resistance changes with exposure to different light intensity. The material selected for light sensor 30 should be optimized to respond to sunlight and/or other ambient, visible light sources typically encountered during driving conditions. Embodiments may additionally or alternatively use more or other light sensitive photodiodes, phototransistors, or combinations thereof. While any known light sensor may be used, cost and environmental regulations may be factors to consider. For example, an LDR, such as: lead sulfide, cadmium sulfide, indium antiomnide, cadmium selenide, and/or lead selenide may be utilized. Some preferred materials have a spectral response and peak sensitivity that coincide, at least in part, with those of the human eye.

The light sensor 30 communicates with a processor or other appropriate circuitry that may monitor the absolute signal from the light sensor 30 and variations in the signal The processor may utilize one or both of these variables for subsequent adjustment of the intensity of a backlight, LED, or the like of the display 28. It is noted that the processor may instruct the display 28 to change intensity via current or voltage supplied to the display. In some embodiments, the processor may communicate with a display driver that may instruct or control the brightness of the display 28. In this manner, the brightness of the display 28 may adjust without the need for operator intervention.

Figure 2:
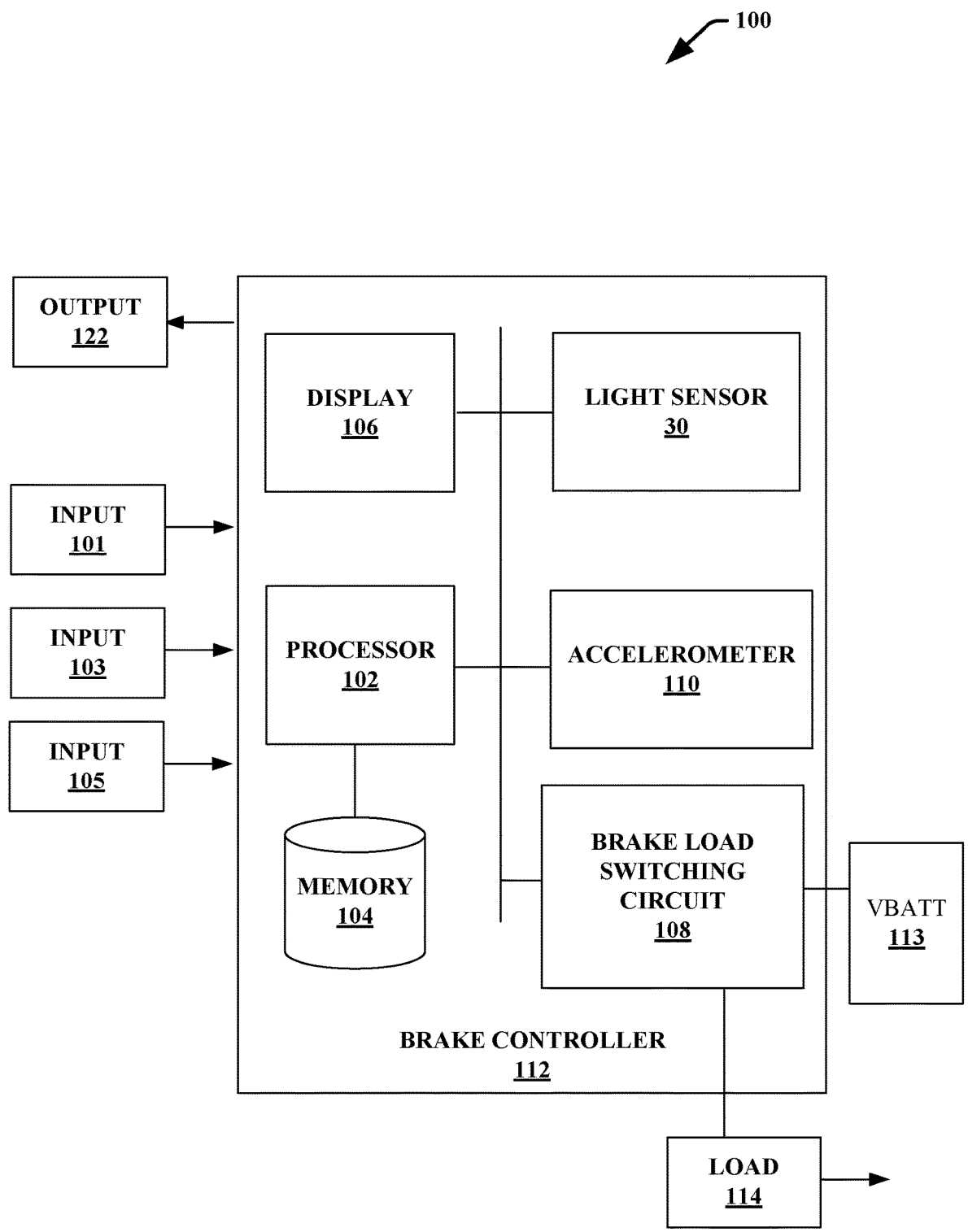
FIG. 2 is a schematic representation of a brake controller according to various disclosed aspects.

FIG. 2 shows a general schematic for brake controller 100 according to certain aspects of this disclosure. The brake controller 100 primarily includes a printed circuit board (PCB) 112 coupled with a processor 102 which execute computer executable instructions that may be stored in memory 104. The processor 102 may be in communication with a display 106, a light sensor or LDR 30, a brake load switching circuit 108 (which may selectively apply or adjust a signal sent to a brake load 114), and a power source 113. It is noted that the brake controller 100 may comprise other or different components. Moreover, while components are illustrated as separate components, various components may be one or more components. In another aspect, the components may be communicatively coupled together in appropriate configurations. For instance, the PCB 112 may comprise one or more PCBs communicatively coupled together.

Figure 3:
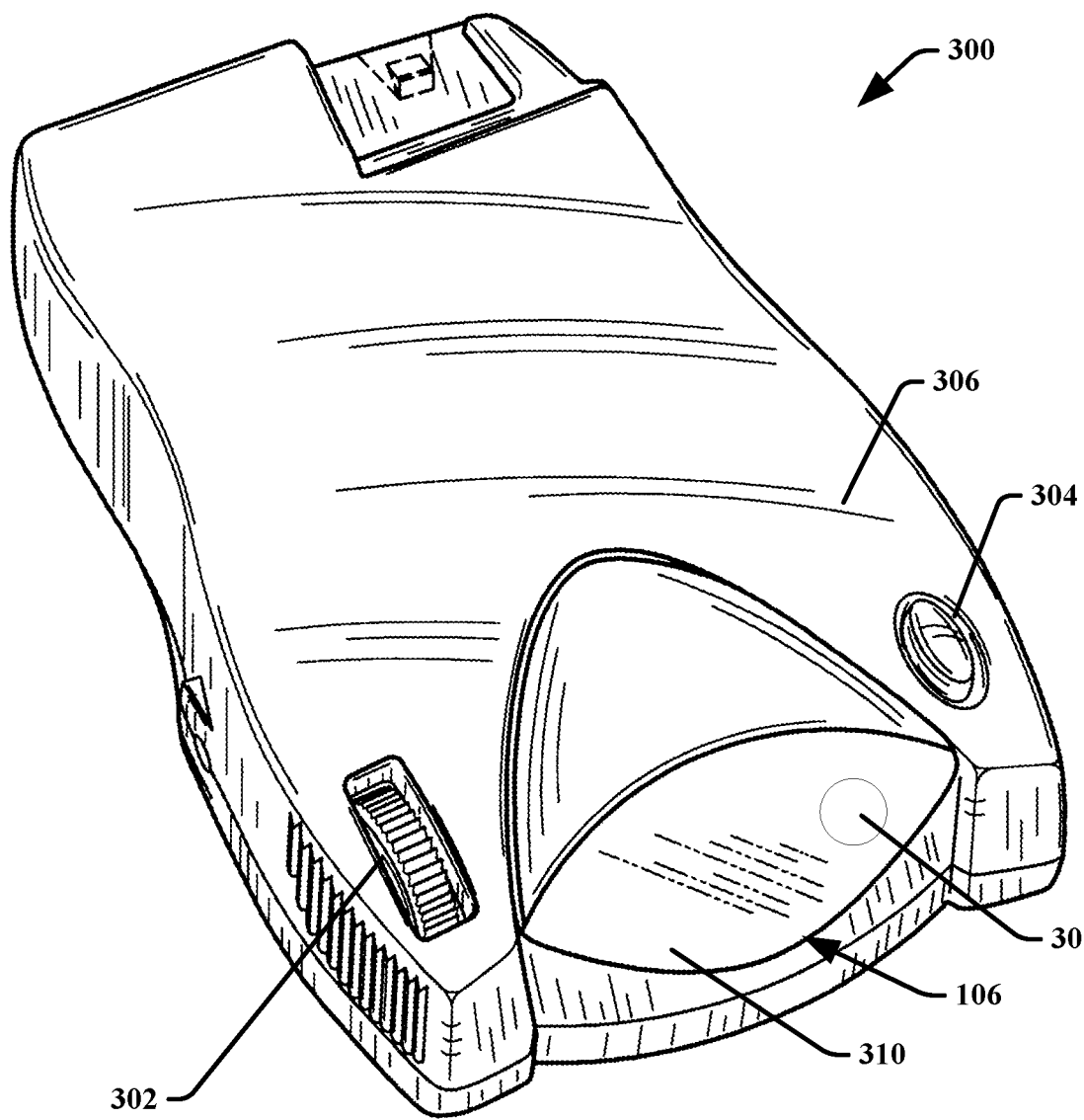
FIG. 3 is a perspective view of a brake control unit comprising a light sensor in according to various disclosed aspects.

It is noted that the PCB 112 may be housed in a housing. Such as shown in FIG. 3. The housing 300 may comprise plastic, metal, or other materials. Moreover, the housing 300 may be mountable or attachable to a mount that allows for placement of the housing 300 in a desired location. It is noted that the housing 300 may be utilized with other devices of a brake control system, such as hand control 20, an anti-sway device, or the like. In some embodiments, the housing 300 may include interface devices such as dial 302 and button 304.

In operation, light sensor 30 detects ambient incident light. The light sensor 30 may generate signals that are communicated to the processor 102. In some embodiments, the light sensor 30 generates output that is received by a display driver. The display drive may communicate the output to the processor 102. In other embodiments, the L light sensor 30 may communicate with other components and may include filters or the like.

The brake controller 100 may convert output from the light sensor 30 to be read by the processor. For instance, the output of an LDR may be converted from resistance to voltage and may be received by the processor 102. The resulting voltage signal is read and may be stored in memory 104 for additional reference and processing. In this manner, changes in the light intensity detected by light sensor 30 can be monitored, with the processor 102 modifying the brightness of the display unit 106 (which may comprise a 7-segment LED display or the like) in response thereto.

In at least one example, the processor 102 may send or modify signals sent to the display 106. For instance, the processor 102 may send voltage or current based signals to the display 106 that may alter the intensity or brightness of the display. For instance, the processor 102 may employ a PWM signals to dim or brighten the display 106. In particular, a higher duty cycle PWM signal is provided in response to relatively higher intensities of light (e.g., this might be encountered if the light sensor 30 is positioned in direct sunlight), whereas a lower duty cycle PWM signal is produced when the light sensor 30 detects relatively lower intensities of light. In this manner, the display 106 may be sufficiently bright and visible in daylight while also avoiding overly bright settings in dusk or darker conditions where brightness may prove to be a distraction to the driver.

In at least one embodiment, a transfer function of the light sensor 30 output versus the brightness (e.g., PWM) may be adjusted. This may be adjusted based in part on a user preference, calibration, or the like. As an example, the user may utilize button 304, dial 302, or other input devices (e.g., such as a smartphone or the like) to adjust the sensitively, period, granularity, or other parameters of light adjustments. It is noted, however, that the use of a display driver to adjust the brightness may allow the processor 102 to send direct commands to the display driver, such as commands to set brightness to a desired level.

Processor 102 may receive a variety of other inputs e.g., input 101, 103, 105, in addition or as part of data supplied by light sensor 30. For instance, the inputs may comprise manual input 101, gain input 103, and boost input 105. While shown as independent inputs provided to the microprocessor 102, these features could be integrated via a single linkage or different linkages.

The memory 104 may cooperate with the processor to facilitate the generation of a brake output signal supplied to brake load 114 of the towed vehicle without necessarily engaging the brakes of the towing vehicle. Memory 104 may also be employed for other outputs and periodic notifications, as well as to store any additional inputs provided to the processor 102 by user interfaces, a wirelessly received input, or the like.

In at least some embodiments, an accelerometer 110 and brake load switching current 108 may be provided. VBATT 113 may comprise the towing vehicle's power supply, an independent battery or other power source (e.g., from the towed vehicle) associated with controller 100.

Referring again to FIG. 3, the light sensor 30 may be disposed proximal to the display 106. This may allow the light sensor 30 to be exposed to ambient light at generally the same or similar intensities as the display 106. The display 106 may include a lens 310 disposed on a housing 306. The light sensor 30 may be disposed beneath the lens 310. The processor 102 may be calibrated to account for the properties of the lens 310, such as color, shade, shape, or transparency. Moreover, the lens 310 may comprise two or more layers or sections having different properties. As an example, the lens 310 may comprise a generally clear plastic or glass layer and a second lens disposed over the light sensor 30.

In some embodiments the processor 102 may account for the position (e.g., where relative the housing 306 the light sensor is located) and orientation (e.g., pitch, roll, yaw, etc.) of the light sensor 30 to determine the level of brightness for the display 106. For instance, a sensitive surface of the light sensor 30 may be coplanar, parallel, or at an angle relative a planar surface of the lens 310. In some embodiments, the light sensor 30 may be positioned on a mount attached to a PCB. The mount may position and orient the light sensor proximal the lens 310. It is noted, however, that the light sensor 30 may be mounted directly on a housing and may be coupled to the processor via a wired or hardwired connection. In other embodiments, the sensitive surface of the light sensor 30 may be disposed at a side of the housing 306 or the like. The processor 102 may be programmed to account for the positon and orientation of the light sensor 30 such that output of the light sensor 30 may correspond to an appropriate brightness of the display 106. As described herein, the processor 102 may account for these factors via transfer function that adjusts the measured ambient light at the brightness of the display 106.

In another example, the brake control unit 300 may account for other factors when determining a brightness level for the display 106. For example, the brake control unit 300 may receive user input regarding the position of the brake control unit 300 in a towing or towed vehicle. Generally, when the brake control unit 300 is mounted above the dashboard of a vehicle, it may be exposed to more intense ambient light than when the brake control unit 300 is mounted below the dash. The user may provide input to the brake control unit 300 via user interfaces. The processor 102 may utilize the position information to adjust a transfer function, sensitivity, or the like.

In another aspect, the brake control unit 300 may adjust a brightness of the display 106 based on a schedule. For example, a user may program the brake control unit 300 to adjust the brightness based on a time. The display 106 may be brightened during a first time period and lowered during a second time period. In other examples, the processor 102 may apply a first transfer function during a first time period and may apply a second transfer function during a second time period.

Figure 4:
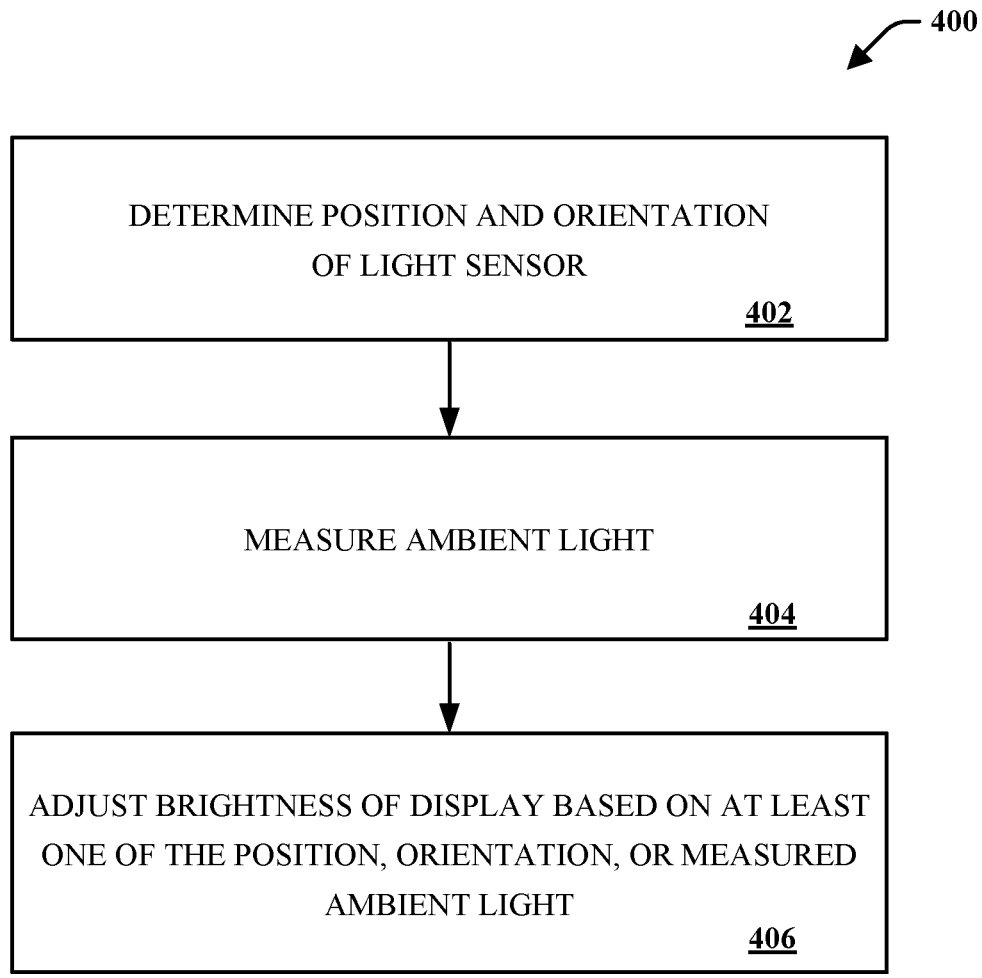
FIG. 4 is a flowchart of a method for adjusting a brightness of a display of a brake controller according to various disclosed aspects.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

In various methods, a brake controller comprising a light sensor, a processor, and a lighted display screen is provided. The method may monitor output of the light sensor, and may vary the input to the display screen to adjust the brightness of the display screen. For instance, the method may adjust a duty cycle, amplitude, voltage or other parameter of a signal sent to a display from a processor. Other aspects of various methods may be apparent throughout this disclosure.

FIG. 4 depicts an exemplary flowchart of non-limiting method 400 associated with a brake control unit, according to various aspects of the subject disclosure. As an example, method 400 may adjust the brightness of a brake controller display based on at least one of sensed ambient light, position of a light sensor, orientation of a light sensor, user settings, or a transfer function that may account for parameters.

At 402, the method may determine a position and orientation of a light sensor of a brake control unit. In at least one example, the position and orientation may be utilized in a calibration or as factors in a transfer function. In another aspect, an appropriate orientation and position may be determined based on a position of a display, a type of lens, a make of the light sensor or the like.

At 404, the method may measure ambient light. Measuring ambient light may include measuring light with a light sensor. In another aspect, measuring ambient light may include reading, by a processor, ambient light from a light sensor. It is noted that the ambient light may be measured based on single reading or based on multiple readings. As described herein, a processor may utilize a filter, such as an averaging of a history of readings from the light sensor.

At 406, the method may adjust the brightness of the display based on at least one of the position, orientation, or measured ambient light. In an example, a transfer function may account for the position or orientation of the light sensor. The transfer function may be stored in memory. It is noted that the transfer function may be adjusted based on user settings or input. The transfer function may receive the measured ambient light as input and may generate a brightness setting of a display. The brightness setting may be represented as a PWM signal, a command, or other signal. The brightness setting may be sent to a display or a display driver as described herein.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A brake control unit comprising:
   a processor;
   a light sensor coupled to the processor and configured to operatively sense ambient light;
   a lens disposed over the light sensor such that readings of the light sensor measure the ambient light and
   a display coupled to the processor and comprising at least one light source,
   wherein the processor is configured to apply a transfer function that generates a brightness setting for the at least one light based on the intensity of the sensed ambient light, the transfer function being based at least in part on parameters associated with the lens.

2. The brake control unit of claim 1, wherein the processor determines the intensity of the sensed ambient light based on at least two readings of the light sensor.

3. The brake control unit of claim 1, wherein the transfer function is based at least in part on a position of the light sensor.

4. The brake control unit of claim 1, wherein the transfer function is based at least in part on an orientation of the light sensor.

5. The brake control unit of claim 1, wherein the light sensor comprises at least one of a phototransistor or a photoresistor.

6. The brake control unit of claim 1, wherein the processor modulates a duty cycle of a pulse width modulated signal sent to the display to adjust the brightness.

7. The brake control unit of claim 1, wherein the processor adjusts a frequency of a signal sent to the display to adjust the brightness.

8. The brake control unit of claim 1, further comprising an accelerometer coupled to the processor, wherein the processor operatively adjusts a signal to be sent to brakes of a towed vehicle based on output of the accelerometer.

9. The brake control unit of claim 8, wherein the processor operatively controls the at least one light to display information associated with the signal to be sent to the brakes of the towed vehicle.

10. The brake control unit of claim 1, wherein the parameters of the lens that the transfer function is based includes a transparency parameter of the lens.

11. A brake control system for controlling brakes of a towed vehicle, the brake control system comprising:
    a housing;
    a display positioned on or within the housing;
    a light sensor disposed proximal to the display;
    a lens disposed over the light sensor such that readings of the light sensor measure the ambient light;
    a processor configured to operatively determine a brightness for the display based on output of the light sensor by applying a transfer function that generates a brightness setting for the at least one light based on the intensity of the sensed ambient light, the transfer function being based at least in part on parameters associated with the lens, and wherein the processor is configured to initiate application of brakes of a towed vehicle; and
    a display driver communicatively coupled to the processor to control the brightness of the display based on input from the transfer function.

12. The brake control system of claim 11, further comprising a brake load switching circuit configured to selectively apply or adjust a signal to be sent to a brake load from the processor.

13. A method comprising:
    measuring ambient light with a light sensor of a brake control unit comprising a brake control unit comprising a processor, a light source, and a display, the light sensor including a lens such that readings of the light sensor measure the ambient light;
    determining, by the processor, a brightness for the display based on the measured ambient light by applying a transfer function that generates a brightness setting for the at least one light based on the intensity of the sensed ambient light, the transfer function being based at least in part on parameters associated with the lens;
    generating, by the processor, a signal to adjust the brightness; and
    adjusting the brightness of the display based on the generated signal to adjust the brightness.

14. The method of claim 13, further comprising determining the brightness based at least in part on at least one of an orientation or position of the light sensor.

15. The method of claim 13, further comprising filtering output of the light sensor by the processor via an averaging function.

16. The method of claim 15, further comprising storing a history of readings of the light sensor in memory.

17. The method of claim 13, further comprising receiving user input associated with the brightness of the display, wherein determining a brightness of the display is further based on the user input.

18. The method of claim 13, further comprising providing the light sensor proximal to the display.

* * * * *